US010291555B2

United States Patent
K et al.

(10) Patent No.: US 10,291,555 B2
(45) Date of Patent: May 14, 2019

(54) SERVICE BASED INTELLIGENT PACKET-IN BUFFERING MECHANISM FOR OPENFLOW SWITCHES BY HAVING VARIABLE BUFFER TIMEOUTS

(71) Applicant: Telefonaktiebolaget L M Ericsson (publ), Stockholm (SE)

(72) Inventors: Faseela K, Bangalore (IN); Vishal Thapar, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 161 days.

(21) Appl. No.: 14/944,084

(22) Filed: Nov. 17, 2015

(65) Prior Publication Data
US 2017/0142034 A1    May 18, 2017

(51) Int. Cl.
| | | |
|---|---|---|
| *H04L 12/861* | (2013.01) | |
| *H04L 1/18* | (2006.01) | |
| *H04L 12/741* | (2013.01) | |
| *H04L 12/721* | (2013.01) | |
| *H04L 12/841* | (2013.01) | |
| *H04L 12/715* | (2013.01) | |

(52) U.S. Cl.
CPC .......... *H04L 49/9094* (2013.01); *H04L 1/188* (2013.01); *H04L 45/38* (2013.01); *H04L 45/74* (2013.01); *H04L 47/28* (2013.01); *H04L 45/64* (2013.01); *H04L 49/9005* (2013.01); *H04L 49/9052* (2013.01); *Y02D 30/30* (2018.01)

(58) Field of Classification Search
CPC .. H04L 45/64; H04L 49/9005; H04L 49/9052
See application file for complete search history.

(56) References Cited

U.S. PATENT DOCUMENTS

| | | | | |
|---|---|---|---|---|
| 2013/0132604 A1* | 5/2013 | Cohen | ................ | H04W 76/15 709/231 |
| 2014/0317684 A1* | 10/2014 | Porras | ................ | H04L 63/20 726/1 |
| 2015/0222550 A1* | 8/2015 | Anand | ................ | H04L 47/11 370/235 |

(Continued)

OTHER PUBLICATIONS

OpenFlow Switch Specification v 1.3.0 (Wire Protocol 0x04), Open Networking Foundation, ONF TS-006, Jun. 25, 2012, 106 pages.

*Primary Examiner* — Luat Phung
(74) *Attorney, Agent, or Firm* — Nicholson Des Vos Webster & Elliott LLP

(57) ABSTRACT

A method is performed by a network device acting as a switch in a Software Defined Networking (SDN) network, where the switch is coupled to a controller in the SDN network. The method implements variable buffer timeout output actions. The method includes generating a flow entry that includes a packet matching criteria and an output action that specifies a buffer timeout value, receiving a packet for forwarding, determining whether the packet matches the packet matching criteria of the flow entry, and storing the packet in a buffer of the switch in response to determining that the packet matches the packet matching criteria of the flow entry, the buffer to temporarily store the packet while the controller determines processing for the packet. The method further includes associating the buffered packet with the buffer timeout value specified in the flow entry and transmitting a portion of the packet to the controller.

17 Claims, 7 Drawing Sheets

(56) References Cited

U.S. PATENT DOCUMENTS

| | | | |
|---|---|---|---|
| 2015/0281127 A1* | 10/2015 | Liu | H04L 49/25 |
| | | | 370/401 |
| 2015/0318941 A1 | 11/2015 | Zheng et al. | |
| 2016/0028620 A1* | 1/2016 | Hari | H04L 45/38 |
| | | | 370/389 |
| 2016/0205048 A1* | 7/2016 | Zhu | H04L 49/70 |
| | | | 370/409 |
| 2016/0315866 A1 | 10/2016 | Thapar et al. | |
| 2017/0026263 A1* | 1/2017 | Gell | H04L 43/0882 |
| 2017/0091258 A1* | 3/2017 | Rajahalme | H04L 29/06 |
| 2017/0288947 A1* | 10/2017 | Kaniampady Sebastian | H04L 45/22 |

* cited by examiner

SERVICE BASED INTELLIGENT PACKET-IN BUFFERING MECHANISM FOR OPENFLOW SWITCHES BY HAVING VARIABLE BUFFER TIMEOUTS

FIELD

Embodiments of the invention relate to the field of Software Defined Networking (SDN), and more specifically, to implementing variable buffer timeouts in an SDN network.

BACKGROUND

Software Defined Networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure.

OpenFlow is a protocol that enables controllers and switches in an SDN network to communicate with each other. OpenFlow enables dynamic programming of flow control policies in the network. An OpenFlow switch uses a Packet-In message to transfer control of a packet to the controller. Packet-In events can be configured to buffer packets at the OpenFlow switch. If the Packet-In event is configured to buffer a packet at the OpenFlow switch and the OpenFlow switch has sufficient memory to buffer the packet, then the Packet-In message contains only some fraction of the packet header and a buffer identifier (ID) to be used by the controller when it is ready for the OpenFlow switch to forward the packet. OpenFlow switches that do not support internal buffering, or that are configured not to buffer packets for Packet-In events, or that have run out of internal buffering space, must send the full packet to the controller. Buffered packets will usually be processed via a Packet-Out message from the controller or automatically expire after some time.

SUMMARY

A method is performed by a network device acting as a switch in a Software Defined Networking (SDN) network, where the switch is coupled to a controller in the SDN network. The method implements variable buffer timeout output actions. The method includes generating a flow entry that includes a packet matching criteria and an output action that specifies a buffer timeout value, receiving a packet for forwarding, determining whether the packet matches the packet matching criteria of the flow entry, and storing the packet in a buffer of the switch in response to determining that the packet matches the packet matching criteria of the flow entry, where the buffer is to temporarily store the packet while the controller determines processing for the packet. The method further includes associating the buffered packet with the buffer timeout value specified in the flow entry and transmitting a portion of the packet to the controller.

A method is performed by a network device acting as a controller in a Software Defined Networking (SDN) network. The method implements variable buffer timeout output actions. The method includes transmitting an instruction to a switch to generate a flow entry that includes a packet matching criteria and an output action that specifies a buffer timeout value.

A network device is configured to implement variable buffer timeout output actions in a Software Defined Networking (SDN) network. The network device is to act as a switch in the SDN network, where the switch is to be coupled to a controller in the SDN network. The network device includes a non-transitory machine-readable storage medium to store a variable buffer timeout output action component and a processor communicatively coupled to the non-transitory machine-readable storage medium. The processor is configured to execute the variable buffer timeout output action component. The variable buffer timeout output action component is configured to generate a flow entry that includes a packet matching criteria and an output action that specifies a buffer timeout value, receive a packet for forwarding, determine whether the packet matches the packet matching criteria of the flow entry, store the packet in a buffer of the switch in response to determining that the packet matches the packet matching criteria of the flow entry, where the buffer is to temporarily store the packet while the controller determines processing for the packet. The variable buffer timeout output action component is further configured to associate the buffered packet with the buffer timeout value specified in the flow entry and transmit a portion of the packet to the controller.

A network device is configured to implement variable buffer timeout output actions in a Software Defined Networking (SDN) network. The network device is to act as a controller in the SDN network. The network device includes a non-transitory machine-readable storage medium to store a variable buffer timeout output action component and a processor communicatively coupled to the non-transitory machine-readable storage medium. The processor is configured to execute the variable buffer timeout output action component. The variable buffer timeout output action component is configured to transmit an instruction to a switch to generate a flow entry that includes a packet matching criteria and an output action that specifies a buffer timeout value.

A non-transitory machine-readable medium has computer code stored therein that is to be executed by a set of one or more processors of a network device. The computer code, when executed by the network device, causes the network device to perform operations for implementing variable buffer timeout output actions in a Software Defined Networking (SDN) network. The network device is to act as a switch in the SDN network, where the switch is to be coupled to a controller in the SDN network. The operations include generating a flow entry that includes a packet matching criteria and an output action that specifies a buffer timeout value, receiving a packet for forwarding, determining whether the packet matches the packet matching criteria of the flow entry, and storing the packet in a buffer of the switch in response to determining that the packet matches the packet matching criteria of the flow entry, where the buffer is to temporarily store the packet while the controller determines processing for the packet. The operations further include associating the buffered packet with the buffer timeout value specified in the flow entry and transmitting a portion of the packet to the controller.

A non-transitory machine-readable medium has computer code stored therein that is to be executed by a set of one or more processors of a network device. The computer code, when executed by the network device, causes the network device to perform operations for implementing variable buffer timeout output actions in a Software Defined Networking (SDN) network. The network device is to act as a controller in the SDN network. The operations include transmitting an instruction to a switch to generate a flow entry that includes a packet matching criteria and an output action that specifies a buffer timeout value.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
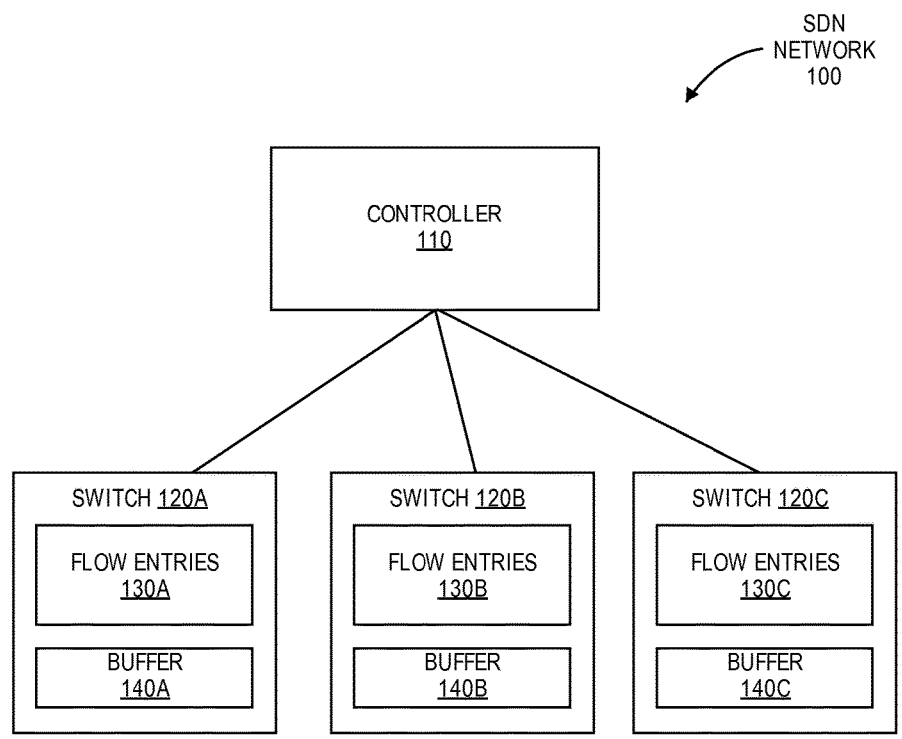
FIG. 1 is a block diagram of a Software Defined Networking (SDN) network in which variable buffer timeout output actions can be implemented, according to some embodiments.

The following description describes methods and apparatus for implementing variable buffer timeout output actions in a Software Defined Networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Software defined networking (SDN) is a network architecture in which the control plane is decoupled from the forwarding plane. An SDN network typically includes multiple forwarding elements (e.g., switches) interconnected with each other and one or more controllers that control the forwarding behavior of the switches. A controller can control the programming of flow tables in the switches to implement any forwarding protocol. A switch forwards packets from an ingress port to an egress port according to the rules in the flow tables. Each entry of a flow table (i.e., flow entry) includes a match field and a corresponding set of instructions. When an incoming packet matches the match field of a flow entry, the corresponding set of instructions are executed for that packet. The set of instructions may instruct the switch to perform various operations on the packet including, but not limited to, forwarding the packet to a given port, modifying certain bits in the packet header, encapsulating the packet, and dropping the packet. When the switch receives a packet for which there is no matching flow entry, the switch typically forwards the packet to the controller to be analyzed. The controller then decides how the packet should be handled. The controller may decide to drop the packet, or the controller can program a flow entry in the switch that provides the switch with instructions on how to process the packet and similar packets in the future.

The controller in an SDN network can program a switch to add, update, or delete flow entries in a flow table both reactively (e.g., in response to the controller receiving a packet from the switch) or proactively. Thus, software defined networking facilitates rapid innovation and deployment of network protocols by providing a programmable network infrastructure.

OpenFlow is a protocol that enables controllers and switches in an SDN network to communicate with each other. An OpenFlow switch uses Packet-In messages to transfer control of a packet to a controller. When a Packet-In message is sent to the controller, the packet can be buffered at the OpenFlow switch, and the Packet-In message may only contain some portion of the packet header (e.g., just the information needed by the controller to determine how the packet should be processed). Buffered packets are usually processed via a Packet-Out message from the controller, or automatically expire after some time.

Currently, OpenFlow does not provide a mechanism to specify different timeout lengths for different buffered packets. As a result, if there are different services running on the controller that take varying length of time to process Packet-In messages, there is no way to increase/decrease the buffering time for the corresponding packet buffered at the OpenFlow switch. Instead, all packets buffered at the OpenFlow switch expire after a constant timeout length.

Embodiments provide benefits over the prior art by enabling a switch to buffer different packets for a different length of time. Embodiments achieve this by programming flow entries in the switch with variable buffer timeout output actions that instruct the switch to buffer matching packets for a specified length of time. When a switch receives an incoming packet that matches a flow entry with a variable buffer timeout output action, the switch buffers the packet and transmits a portion of the packet to the controller. If the switch receives instructions from the controller for processing the buffered packet before the length of time specified in the variable buffer timeout output action expires, then the switch processes the packet according to the instructions. Otherwise, if the specified length of time expires without the switch receiving instructions for processing the buffered packet, the switch deletes the buffered packet.

The ability to specify different timeout lengths for different packets provides additional flexibility and control over how packets are handled in an SDN network. For example, packets associated with certain types of services require more processing time at the controller. Variable buffer timeout output actions allow for such packets to be buffered for a longer time before they are deleted from the buffer. Also, variable buffer timeout output actions allow for differentiated buffer timeout lengths for different services. For example, packets that are associated with a service that does not have real-time requirements or that are associated with a service that can absorb long delays can be assigned a longer buffer timeout period so that the packets can be stored in the buffer for a longer period of time without being deleted from the buffer. This allows the service to be hosted by a geographically distant controller or by a controller with relatively low system resources, without having packets associated with the service being deleted from switch buffers due to long response times.

FIG. 1 is a block diagram of a Software Defined Networking (SDN) network in which variable buffer timeout output actions can be implemented, according to some embodiments. As illustrated, the SDN network 100 includes three switches 120A-C and a controller 110 that controls the switches 120A-C. Each switch 120 includes a set of flow entries 130 and a buffer 140. In one embodiment, a flow entry includes a packet matching criteria (e.g., match field) and a corresponding set of instructions to execute when a packet matches the packet matching criteria. A packet is said to match a flow entry if the packet matches the packet matching criteria of the flow entry. The flow entries 130 are described in more detail herein below with reference to FIG. 2. The buffer 140 of a switch 120 provides temporary storage for packets while the switch 120 waits for instructions from the controller 110 on how to process the packets.

In one embodiment, the controller 110 and the switches 120 communicate using a version of OpenFlow (e.g., OpenFlow 1.3) as the communication protocol. In one embodiment, OpenFlow can be extended as described herein below to support variable buffer timeout output actions in the SDN network 100. For clarity and ease of understanding, embodiments will primarily be described using OpenFlow (and extensions thereto) as the communication protocol between the controller 110 and the switches 120. However, it should be understood that the controller 110 and the switches 120 can communicate using other types of protocols and that other types of protocols can be extended in a similar fashion to support variable buffer timeout output actions without departing from the spirit and scope of the present disclosure.

In one embodiment, after a controller 110 and a switch 120 establish a connection, the controller transmits an OFPT_FEATURES_REQUEST message to the switch 120 requesting that the switch 120 identify capabilities/features supported by the switch 120. The switch 120 then responds to the controller 110 with an OFPT_FEATURES_REPLY message that identifies the capabilities/features supported by the switch 120. In OpenFlow 1.3, only certain capabilities/features are included as part of the OFPT_FEATURES_REPLY message, as defined by ofp_capabilities. In one embodiment, OpenFlow can be extended so that the controller 110 can be informed of additional capabilities/features supported by the switch 120 (e.g., vendor-specific capabilities). In one embodiment, the controller 110 transmits a VENDOR_SPECIFIC_SWITCH_FEATURES_REQUEST message to the switch 120 requesting that the switch 120 identify additional capabilities/features supported by the switch 120. The switch 120 then responds to the controller 110 with a VENDOR_SPECIFIC_SWITCH_FEATURES_REPLY message identifying additional capabilities/features supported by the switch 120. In one embodiment, if the switch 120 supports a variable buffer timeout output action feature, the VENDOR_SPECIFIC_SWITCH_FEATURES_REPLY message includes an indication that the switch 120 supports the variable buffer timeout output action feature.

Upon determining that the switch 120 supports the variable buffer timeout output action feature, the controller 110 may program a flow entry in the switch 120 by transmitting an OFPT_FLOW_MOD message to the switch 120. In one embodiment, the OFPT_FLOW_MOD message includes a packet matching criteria (e.g., match field) and an output action that specifies a buffer timeout value. An output action is an instruction to transmit/forward a packet to a specified OpenFlow port (e.g., the port for transmitting/forwarding the packet to the controller 110). An output action that specifies a buffer timeout value is referred to herein as a variable buffer timeout output action. The variable buffer timeout output action instructs the switch 120 to output the packet to the controller 110, buffer the packet in a buffer of the switch 120, and associate the buffered packet with the buffer timeout value specified in the variable buffer timeout output action. Whenever a packet matches a flow entry with a variable buffer timeout output action, the switch 120 stores the packet in a buffer 140 and associates the buffered packet with the buffer timeout value specified in the flow entry (or the nearest buffer timeout value supported by the switch 120). The switch 120 then transmits a portion of the packet to the controller 110. The switch 120 keeps track of the elapsed lifetime of the buffered packet (i.e., how long it has been in the buffer 140). If the switch 120 receives an instruction from the controller 110 for processing the buffered packet before the elapsed lifetime of the buffered packet reaches or exceeds the buffer timeout value, then the switch 120 processes the packet according to the instructions received from the controller 110 and deletes the buffered packet from the buffer 140. Otherwise, if the elapsed lifetime of the buffered packet reaches or exceeds the buffer timeout value before the switch 120 receives instructions from the controller 110 for processing the buffered packet, then the switch 120 deletes the buffered packet from the buffer 140. In this way, the controller 110 can program flow entries 130 in the switch 120 such that different packets are assigned different buffer timeout values.

In one embodiment, the following exemplary and non-limiting structures can be used for the message exchange between the controller 110 and switches 120 for implementing variable buffer timeout output actions. The exemplary structures extend OpenFlow to support variable buffer timeout output actions.

```
        Capabilities Flag:
enum vendor_specific_switch_features_capabilities flags {
        SERVICE_SPECIFIC_PACKET_IN_BUFFER_TIMEOUT = 1 << 1
};
        VENDOR_SPECIFIC_SWITCH_FEATURES_REQUEST:
/* Experimenter extension. */
/* For Vendor Specific Switch Features Request, send exp_type is
VENDOR_TYPE_SWITCH_FEATURES_REQUEST */
struct ofp_experimenter_header {
   struct ofp_header header; /* Type OFPT_EXPERIMENTER. */
   uint32_t experimenter;   /* Experimenter ID:
                * - MSB 0: low-order bytes are IEEE OUI.
                * - MSB != 0: defined by ONF. */
   uint32_t exp_type;     /* Experimenter defined. */
   /* Experimenter-defined arbitrary additional data. */
};
OFP_ASSERT(sizeof(struct ofp_experimenter_header) == 16);
        VENDOR_SPECIFIC_SWITCH_FEATURES_REPLY:
struct vendor_switch_features_reply {
        struct ofp_experimenter_header  exp_header; /* exp_type is
                                VENDOR_TYPE_SWITCH_FEATURES_RESPONSE */
        uint64_t datapath_id;  /* Datapath unique ID.*/
        uint32_t length;     /* length of exp_capabilities in bytes */
        uint8_t pad[4];      /* Align to 64 bits */
        /* Followed by length bytes containing the capabilities data */
        uint8_t exp_capabilities[0];  /* Bitmap of support
                                "vendor_switch_features_capabilities". */
};
OFP_ASSERT(sizeof(struct vendor_switch_features_reply) == 32);
        Common Header:
/* All messages in this extension use the following message header */
/* Common header for all messages */
struct vendor_header {
        struct ofp_header header; /* OFPT_EXPERIMENTER. */
        uint32_t experimenter; /* VENDOR_EXPERIMENTER_ID. */
        uint32_t exp_type; /* One of MSG_TYPE_* above. */
};
```

```
OFP_ASSERT(sizeof(struct vendor_header) == sizeof(struct ofp_experimenter_header));
    Variable Buffer Timeout Output Action:
struct ofp_action_buffer_specific_output {
    uint16_t type; /* OFPAT_OUTPUT. */
    uint16_t len; /* Length is 16. */
    uint16_t port; /* CONTROLLER */
    uint16_t buffer_timeout /* timeout after which the buffered packet should expire */
    uint16_t max_len; /* Max length to send to controller. */
};
```

Figure 2:
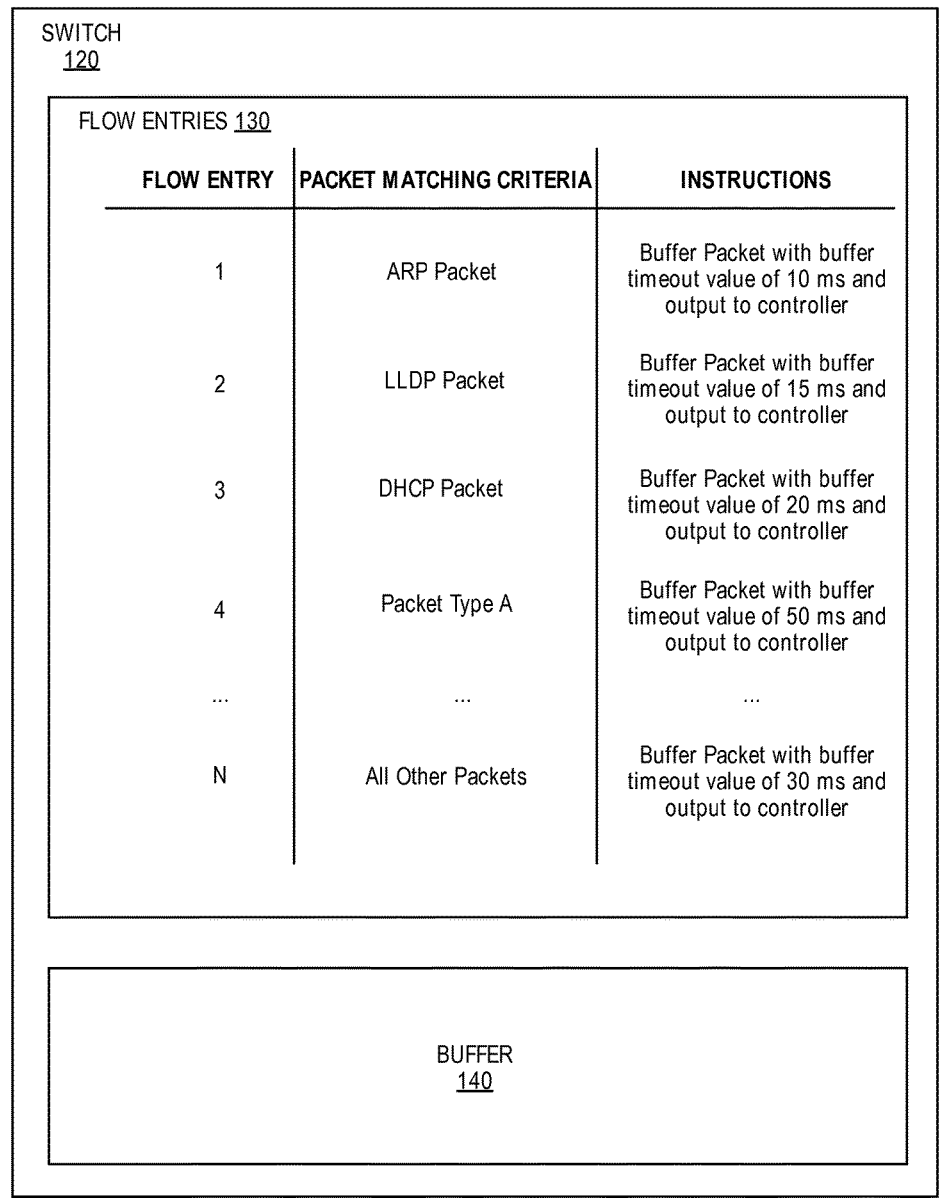
FIG. 2 is a diagram illustrating a switch that is programmed with a set of flow entries including variable buffer timeout output actions, according to some embodiments.

FIG. 2 is a diagram illustrating a switch that is programmed with a set of flow entries including variable buffer timeout output actions, according to some embodiments. In one embodiment, a controller 110 initiates the programming of the flow entries 130 in the switch 120. Each flow entry includes a packet matching criteria and a corresponding set of instructions. When the switch 120 receives a packet that matches a packet matching criteria of a flow entry, the switch 120 executes the corresponding set of instructions of that flow entry. As illustrated, the switch 120 includes N flow entries.

The first flow entry has a packet matching criteria that matches packets associated with an Address Resolution Protocol (ARP) service. The corresponding instruction is a variable buffer timeout output action that instructs the switch 120 to buffer matching packets with a buffer timeout value of 10 milliseconds and output (i.e., transmit/forward) matching packets (or a relevant portion thereof) to the controller. In one embodiment, the packet matching criteria identifies ARP packets by matching ETH_TYPE=0x806. Thus, if the switch 120 receives an incoming ARP packet, then the switch 120 buffers the packet in a buffer 140 of the switch 120, associates the buffered packet with a buffer timeout value of 10 milliseconds, and transmits the packet (or a relevant portion thereof) to the controller 110. If the elapsed lifetime of the buffered packet reaches or exceeds 10 milliseconds and the switch 120 has not received instructions from the controller 110 for processing the buffered packet, then the switch 120 may delete the buffered packet from the buffer 140.

The second flow entry has a packet matching criteria that matches packets associated with a Link Layer Discovery Protocol (LLDP) service. The corresponding instruction is a variable buffer timeout output action that instructs the switch 120 to buffer matching packets with a buffer timeout value of 15 milliseconds and output (i.e., transmit/forward) matching packets (or a relevant portion thereof) to the controller 110. In one embodiment, the packet matching criteria identifies LLDP packets by matching ETH_TYPE=0x88cc. Thus, if the switch 120 receives an incoming LLDP packet, then the switch 120 buffers the packet in the buffer 140 of the switch 120, associates the buffered packet with a buffer timeout value of 15 milliseconds, and transmits the packet (or a relevant portion thereof) to the controller 110. If the elapsed lifetime of the buffered packet reaches or exceeds 15 milliseconds and the switch 120 has not received instructions from the controller 110 for processing the buffered packet, then the switch 120 may delete the buffered packet from the buffer 140.

The third flow entry has a packet matching criteria that matches packets associated with a Dynamic Host Configuration Protocol (DHCP) service. The corresponding instruction is a variable buffer timeout output action that instructs the switch 120 to buffer matching packets with a buffer timeout value of 20 milliseconds and output (i.e., transmit/forward) matching packets (or a relevant portion thereof) to the controller 110. In one embodiment, the packet matching criteria identifies DHCP packets by matching ETH_TYPE=0x800 (IP), IP_PROTO=0x11 (UDP), and UDP_SRC/UDP_DST=67/68, depending on whether it is client/server traffic. Thus, if the switch 120 receives an incoming DHCP packet, then the switch 120 buffers the packet in the buffer 140 of the switch 120, associates the buffered packet with a buffer timeout value of 20 milliseconds, and transmits the packet (or a relevant portion thereof) to the controller 110. If the elapsed lifetime of the buffered packet reaches or exceeds 20 milliseconds and the switch 120 has not received instructions from the controller 110 for processing the buffered packet, then the switch 120 may delete the buffered packet from the buffer 140.

The fourth flow entry has a packet matching criteria that matches packet type A (can be user-defined). The corresponding instruction is a variable buffer timeout output action that instructs the switch 120 to buffer matching packets with a buffer timeout value of 50 milliseconds and output (i.e., transmit/forward) matching packets (or a relevant portion thereof) to the controller 110. Thus, if the switch 120 receives an incoming packet of packet type A, then the switch 120 buffers the packet in the buffer 140 of the switch 120, associates the buffered packet with a buffer timeout value of 50 milliseconds, and transmits the packet (or a relevant portion thereof) to the controller 110. If the elapsed lifetime of the buffered packet reaches or exceeds 50 milliseconds and the switch 120 has not received instructions from the controller 110 for processing the buffered packet, then the switch 120 may delete the buffered packet from the buffer 140.

The Nth flow entry is a catch all entry that matches packets that did not match any of the other flow entries. The corresponding instruction is a variable buffer timeout output action that instructs the switch 120 to buffer matching packets with a buffer timeout value of 30 milliseconds and output (i.e., transmit/forward) matching packets (or a relevant portion thereof) to the controller 110. Thus, if the switch 120 receives an incoming packet that does not match any of the other flow entries of the switch 120, then the switch 120 buffers the packet in a buffer 140 of the switch 120, associates the buffered packet with a buffer timeout value of 30 milliseconds, and transmits the packet (or a relevant portion thereof) to the controller 110. If the elapsed lifetime of the buffered packet reaches or exceeds 30 milliseconds and the switch 120 has not received instructions from the controller 110 for processing the buffered packet, then the switch may delete the buffered packet from the buffer 140.

In this way, the flow entries 130 of the switch 120 can be programmed to apply different buffer timeout values for different packets. In the example given above, the flow entries 130 of the switch 120 are programmed such that ARP packets are buffered for a maximum of 10 milliseconds, LLDP packets are buffered for a maximum of 15 milliseconds, DHCP packets are buffered for a maximum of 20 milliseconds, packets of packet type A (which may be user-defined) are buffered for a maximum of 50 milliseconds. Packets that do not match any of the other flow entries are buffered for a maximum of 30 milliseconds. The variable buffer timeout output actions allow for control over the buffer timeout value so that packets associated with different services can be assigned different buffer timeout values. Packets associated with services that require longer processing time at the controller 110 can be assigned longer buffer timeout values so that they are not deleted from switch buffers 140 due to long response times.

It is to be understood that the flow entries 130 described herein and illustrated in the figures are provided by way of example and not limitation. It should be understood that the switch 120 can include any number of flow entries 130, and that the flow entries 130 can have any desired packet matching criteria. Also, the instructions of the flow entries 130 may include other instructions besides buffering a packet (with a specific buffer timeout value) and outputting (i.e., transmitting/forwarding) the packet to a controller. For example, flow entries 130 can include instructions to push/pop tags, modify packet header fields, change the time-to-live (TTL) of the packet, and other packet processing instructions.

Figure 3:
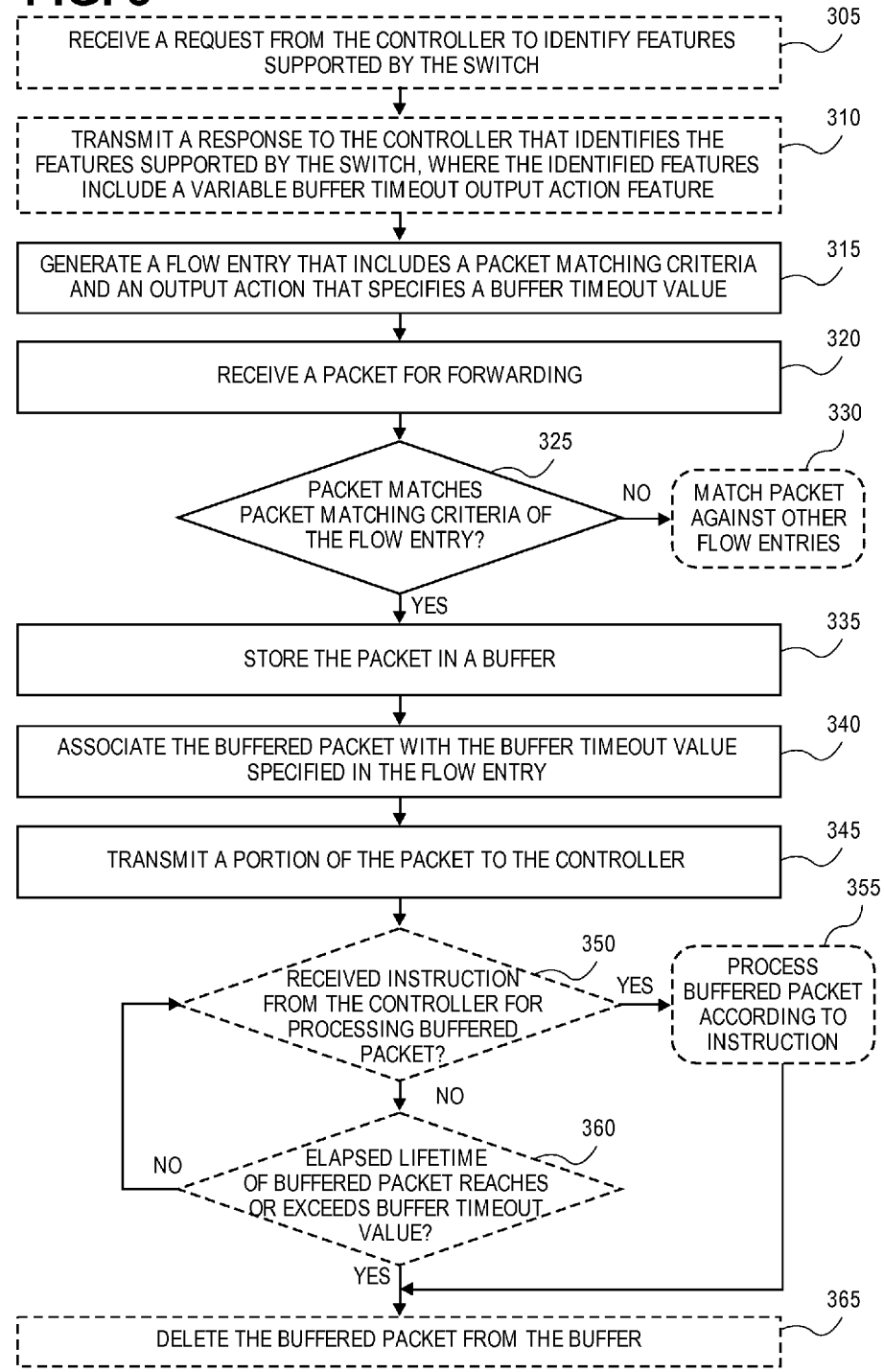
FIG. 3 is a flow diagram of a process performed by a switch for implementing variable buffer timeout output actions, according to some embodiments.

FIG. 3 is a flow diagram of a process performed by a switch for implementing variable buffer timeout output actions, according to some embodiments. In one embodiment, the operations of the flow diagram may be performed by a network device acting as a switch 120 in an SDN network 100, where the switch 120 is communicatively coupled to a controller 110. In one embodiment, the switch 120 and the controller 110 communicate using an extension to OpenFlow. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the switch 120 establishes a connection with the controller 110. In one embodiment, after the switch 120 establishes the connection with the controller 110, the switch 120 receives a request from the controller 110 to identify features supported by the switch 120 (block 305). In one embodiment, the request is in the form of the VENDOR_TYPE_SWITCH_FEATURES_REQUEST structure described above, or similar structure. The switch 120 then transmits a response to the controller 110 that identifies the features supported by the switch 120 (block 310). In one embodiment, the response is in the form of the VENDOR_SPECIFIC_SWITCH_FEATURES_REPLY structure described above, or similar structure. The VENDOR_SPECIFIC_SWITCH_FEATURES_REPLY structure may include a field for identifying the features/capabilities supported by the switch 120 (e.g., exp_capabilities field). In one embodiment, if the switch 120 supports a variable buffer timeout output action feature, then the response transmitted to the controller 110 will include an indication that the switch 120 supports the variable buffer timeout output action feature. Transmitting this response to the controller 110 serves to notify the controller 110 that the controller 110 may program the switch 120 with flow entries including variable buffer timeout output actions.

In one embodiment, the switch 120 receives an instruction from the controller 110 to generate a flow entry that includes a packet matching criteria and an output action that specifies a buffer timeout value. In one embodiment, the instruction is an OpenFlow OFPT_FLOW_MOD message. In one embodiment, the instruction specifies the packet matching criteria and the output action. In one embodiment, the packet matching criteria in the instruction matches packets that are associated with a given service such as an Address Resolution Protocol (ARP) service, a Link Layer Discovery Protocol (LLDP) service, or a Dynamic Host Configuration Protocol (DHCP) service. These packet matching criteria are provided by way of example and not limitation. It should be understood that the instruction can include any desired packet matching criteria. In one embodiment, the output action in the instruction is specified in the form of the Variable Buffer Timeout Output Action structure described above, or similar structure. The Variable Buffer Timeout Output Action structure may include a field for specifying the buffer timeout value (e.g., buffer_timeout field). In one embodiment, the buffer timeout value is a value indicative of a length of time after which a matching packet should be deleted from a buffer 140. The buffer timeout value can be specified in any format that the switch 120 can understand. For example, the buffer timeout value can be specified in terms of milliseconds, seconds, or any other suitable unit of time. In one embodiment, the buffer timeout value specifies a time (e.g., 1:00 pm) at which a buffered packet should be deleted from a buffer 140. This may require synchronizing the clocks between the switch 120 and the controller 110. In response to receiving the instruction, the switch 120 generates a flow entry that includes the packet matching criteria and the output action that specifies the buffer timeout value (block 315). In one embodiment, the switch 120 may not support the exact buffer timeout value specified in the instruction received from the controller 110. In this case, the switch may generate the flow entry such that the output action of the flow entry specifies the nearest buffer timeout value supported by the switch 120 (e.g., by rounding up or rounding down).

When the switch 120 receives a packet for forwarding (block 320), the switch determines whether the packet matches the packet matching criteria of the flow entry (decision block 325). If the packet does not match the packet matching criteria of the flow entry, then the switch 120 attempts to match the packet against other flow entries of the switch 120 (block 330), as needed. If the packet matches the packet matching criteria of the flow entry, then the switch 120 stores the packet in a buffer 140 (block 335). The switch 120 then associates the buffered packet with the buffer timeout value specified in the flow entry (block 340). In one embodiment, the switch 120 has multiple buffers 140, where each buffer is associated with a buffer timeout value. For example, the switch could include a first buffer that is associated with a 20 millisecond buffer timeout value and a second buffer that is associated with a 50 millisecond buffer timeout value. The entries stored in the first buffer expire after 20 milliseconds and the entries stored in the second buffer expire after 50 milliseconds. In such an embodiment, the switch 120 may store the packet in the buffer 140 that is associated with the buffer timeout value specified in the flow entry. The switch 120 then transmits a portion of the packet to the controller (block 345). In one embodiment, the portion of the packet is transmitted to the controller as part of an OpenFlow OFPT_PACKET_IN message (i.e., Packet-In message).

The switch 120 keeps track of an elapsed lifetime of the buffered packet. The switch 120 checks if it has received an instruction from the controller 110 for processing the buffered packet (decision block 350). If so, then the switch 120 processes the buffered packet according to the instructions received from the controller 110 (block 355) and deletes the buffered packet from the buffer 140 (block 365). Otherwise, if the switch 120 has not received an instruction from the controller 110 for processing the buffered packet, then the switch 120 determines whether the elapsed lifetime of the buffered packet reaches or exceeds the buffer timeout value (decision block 360). If not, the switch 120 keeps waiting for an instruction from the controller 110 for processing the buffered packet. Otherwise, if the switch 120 determines that the elapsed lifetime of the buffered packet reaches or exceeds the buffer timeout value, then the switch 120 deletes the buffered packet from the buffer 140 (block 365).

As a result of the operations of the flow diagram, the switch 120 is programmed (e.g., by a controller 110) to buffer packets matching a given packet matching criteria with a specific buffer timeout value.

Figure 4:
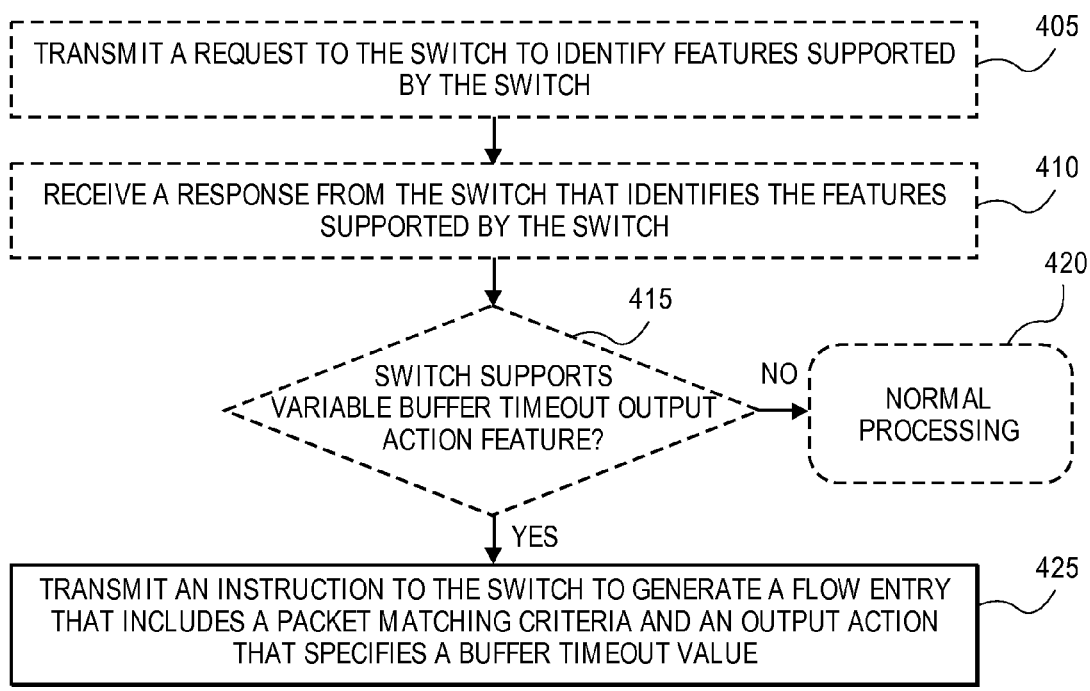
FIG. 4 is a flow diagram illustrating a process performed by a controller for implementing variable buffer timeout output actions, according to some embodiments.

FIG. 4 is a flow diagram illustrating a process performed by a controller for implementing variable buffer timeout output actions, according to some embodiments. In one embodiment, the operations of the flow diagram may be performed by a network device acting as a controller 110 in an SDN network 100, where the controller 110 is communicatively coupled to a switch 120. In one embodiment, the switch 120 and the controller 110 communicate using an extension to OpenFlow.

In one embodiment, the process is initiated when the controller 110 establishes a connection with the switch 120. In one embodiment, after the controller 110 establishes the connection with the switch 120, the controller 110 transmits a request to the switch 120 to identify features supported by the switch 120 (block 405). In one embodiment, the request is in the form of the VENDOR_TYPE_SWITCH_FEATURES_REQUEST structure described above, or similar structure. The controller 110 then receives a response from the switch 120 that identifies the features supported by the switch 120 (block 410). In one embodiment, the response is in the form of the VENDOR_SPECIFIC_SWITCH_FEATURES_REPLY structure described above, or similar structure. The VENDOR_SPECIFIC_SWITCH_FEATURES_REPLY structure may include a field for identifying the features/capabilities supported by the switch 120 (e.g., exp_capabilities field). If the switch 120 supports a variable buffer timeout output action feature, the response received by the controller 110 will include an indication that the switch supports the variable buffer timeout output action feature. The controller 110 determines whether the switch 120 supports the variable buffer timeout output action feature (decision block 415). If the switch 120 does not support the variable buffer timeout output action feature, then the controller 110 proceeds with normal processing (i.e., without the variable buffer timeout output action feature) (block 420). Otherwise, if the switch 120 supports the variable buffer timeout output action feature, then the controller 110 transmits an instruction to the switch 120 to generate a flow entry that includes a packet matching criteria and an output action that specifies a buffer timeout value (block 425). In one embodiment, the instruction is an OpenFlow OFPT_FLOW_MOD message. In one embodiment, the instruction specifies the packet matching criteria and the output action.

In one embodiment, the packet matching criteria in the instruction matches packets that are associated with a given service such as an Address Resolution Protocol (ARP) service, a Link Layer Discovery Protocol (LLDP) service, or a Dynamic Host Configuration Protocol (DHCP) service. These packet matching criteria are provided by way of example and not limitation. It should be understood that the instruction can include any desired packet matching criteria. In one embodiment, the output action in the instruction is specified in the form of the Variable Buffer Timeout Output Action structure described above, or similar structure. The Variable Buffer Timeout Output Action structure may include a field for specifying the buffer timeout value (e.g., buffer_timeout field). In one embodiment, the buffer timeout value is a value indicative of a length of time after which a matching packet should be deleted from a buffer 140. The buffer timeout value can be specified in any format that the switch 120 can understand. For example, the buffer timeout value can be specified in terms of milliseconds, seconds, or any other suitable unit of time. In one embodiment, the buffer timeout value specifies a time (e.g., 1:00 pm) at which a buffered packet should be deleted from a buffer 140. This may require synchronizing the clocks between the switch 120 and the controller 110. As a result of the operations of the flow diagram, the controller 110 programs the switch 120 to buffer packets matching a given packet matching criteria with a specific buffer timeout value.

Figure 5A:
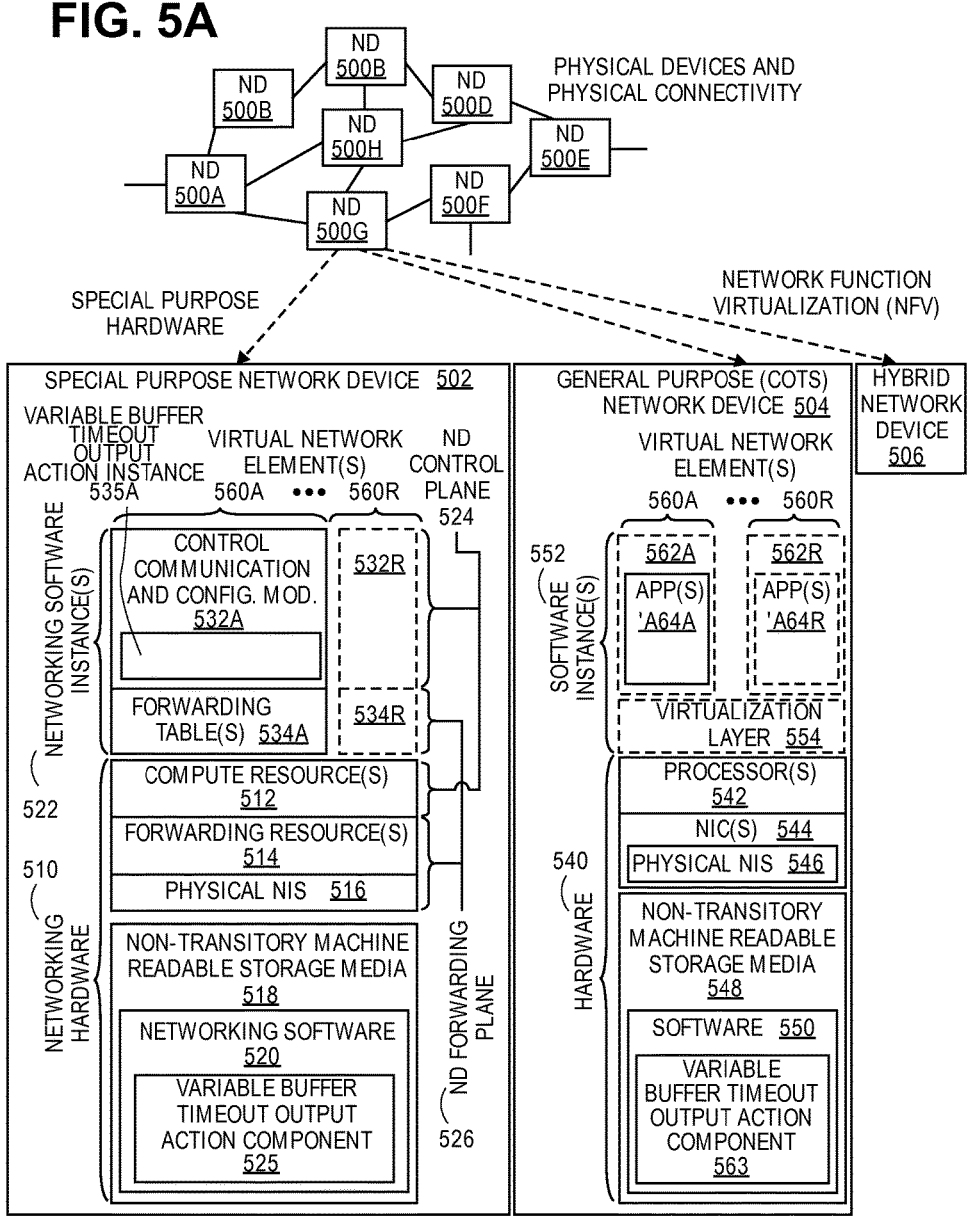
FIG. 5A illustrates connectivity between network devices (NDs) within an exemplary network, as well as three exemplary implementations of the NDs, according to some embodiments.

FIG. 5A illustrates connectivity between network devices (NDs) within an exemplary network, as well as three exemplary implementations of the NDs, according to some embodiments. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine-readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

Software 520 can include code, such as variable buffer timeout output action component 525, which when executed by networking hardware 510, causes networking hardware 510 to perform operations of one or more embodiments described herein above as part of networking software instances 522 (e.g., variable buffer timeout output action instance 535A).

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
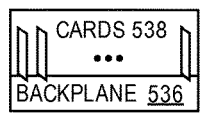
FIG. 5B illustrates an exemplary way to implement a special-purpose network device according to some embodiments.

FIG. 5B illustrates an exemplary way to implement the special-purpose network device 502 according to some embodiments. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine-readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization—represented by a virtualization layer 554 and software containers 562A-R. For example, one such alternative embodiment implements operating system-level virtualization, in which case the virtualization layer 554 represents the kernel of an operating system (or a shim executing on a base operating system) that allows for the creation of multiple software containers 562A-R that may each be used to execute one of the sets of applications 564A-R. In this embodiment, the multiple software containers 562A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 554 represents a hypervisor (sometimes referred to as a virtual machine monitor (VMM)) or a hypervisor executing on top of a host operating system; and 2) the software containers 562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 564A-R, as well as the virtualization layer 554 and software containers 562A-R if implemented, are collectively referred to as software instance(s) 552. Each set of applications 564A-R, corresponding software container 562A-R if implemented, and that part of the hardware 540 that executes them (be it hardware dedicated to that execution and/or time slices of hardware temporally shared by software containers 562A-R), forms a separate virtual network element(s) 560A-R.

The virtual network element(s) 560A-R perform similar functionality to the virtual network element(s) 530A-R— e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 562A-R differently. For example, while embodiments of the invention are illustrated with each software container 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 562A-R to VNEs also apply to embodiments where such a finer level of granularity is used.

In certain embodiments, the virtualization layer 554 includes a virtual switch that provides similar forwarding services as a physical Ethernet switch. Specifically, this virtual switch forwards traffic between software containers 562A-R and the NIC(s) 544, as well as optionally between the software containers 562A-R; in addition, this virtual switch may enforce network isolation between the VNEs 560A-R that by policy are not permitted to communicate with each other (e.g., by honoring virtual local area networks (VLANs)).

Software 550 can include code, such as variable buffer timeout output action component 563, which when executed by processor(s) 542, cause processor(s) 542 to perform operations of one or more embodiments described herein above as part of software containers 562A-R.

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 5C:
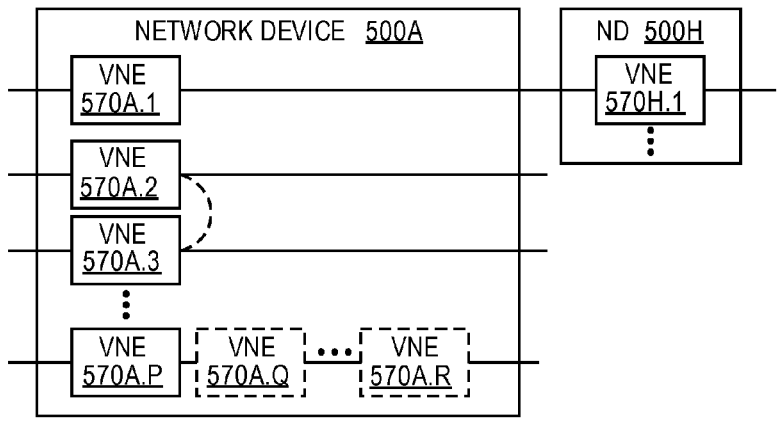
FIG. 5C illustrates various exemplary ways in which virtual network elements (VNEs) may be coupled according to some embodiments.

FIG. 5C illustrates various exemplary ways in which VNEs may be coupled according to some embodiments. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software containers 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
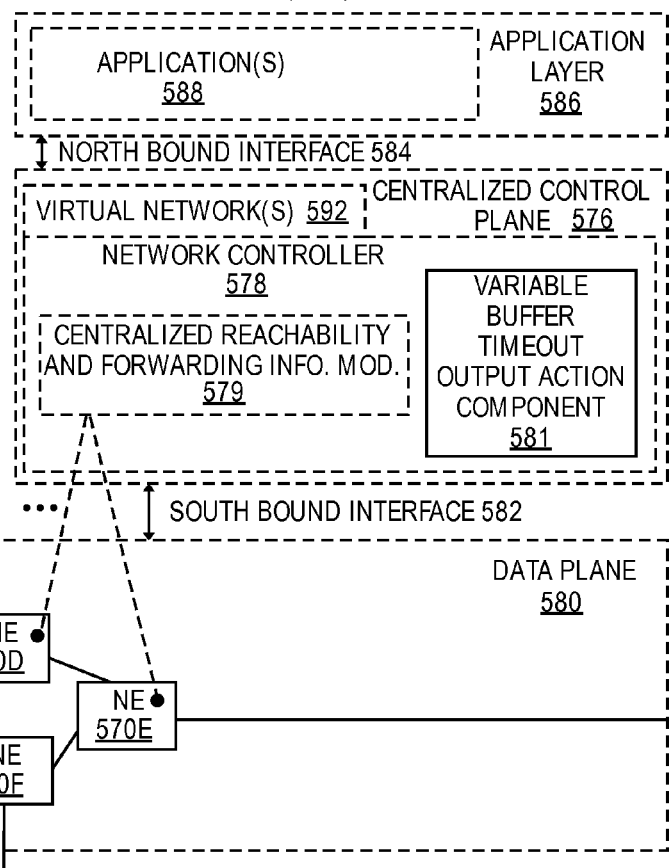
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the network controller 578 may include a variable buffer timeout output action component 581 that when executed by the network controller 578, causes the network controller 578 to perform operations of one or more embodiments described herein above.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
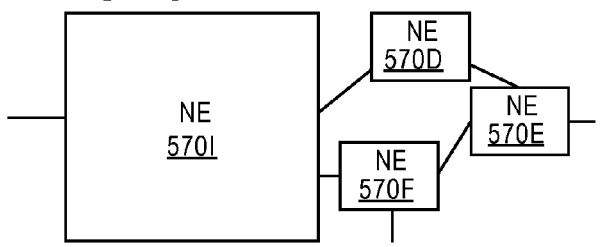
FIG. 5E illustrates the simple case of where each of the NDs implements a single NE, but a centralized control plane has abstracted multiple of the NEs in different NDs into (to represent) a single NE in one of the virtual network(s), according to some embodiments.
Figure 5F:
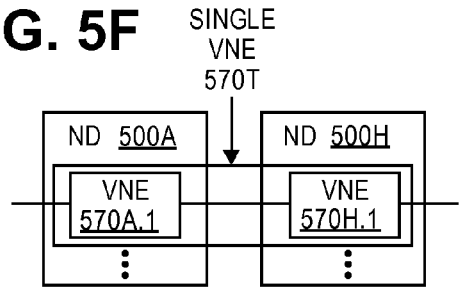
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments. Thus, the abstraction of a NE or VNE can span multiple NDs.

While some embodiments implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
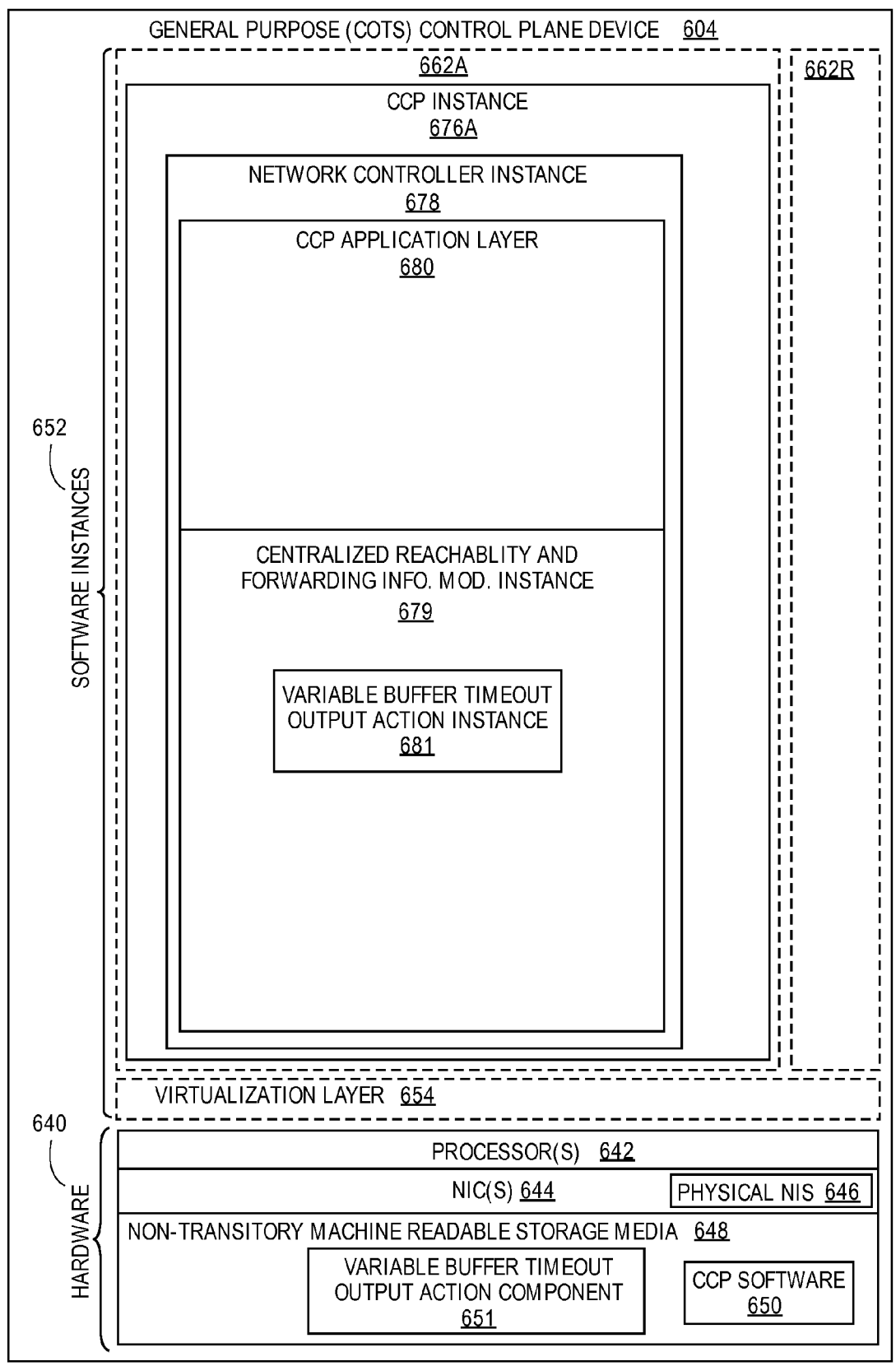
FIG. 6 illustrates a general purpose control plane device with centralized control plane (CCP) software, according to some embodiments.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine-readable storage media 648 having stored therein centralized control plane (CCP) software 650 and a variable buffer timeout output action component 651.

In embodiments that use compute virtualization, the processor(s) 642 typically execute software to instantiate a virtualization layer 654 and software container(s) 662A-R (e.g., with operating system-level virtualization, the virtualization layer 654 represents the kernel of an operating system (or a shim executing on a base operating system) that allows for the creation of multiple software containers 662A-R (representing separate user space instances and also called virtualization engines, virtual private servers, or jails) that may each be used to execute a set of one or more applications; with full virtualization, the virtualization layer 654 represents a hypervisor (sometimes referred to as a virtual machine monitor (VMM)) or a hypervisor executing on top of a host operating system, and the software containers 662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 650 (illustrated as CCP instance 676A) is executed within the software container 662A on the virtualization layer 654. In embodiments where compute virtualization is not used, the CCP instance 676A on top of a host operating system is executed on the "bare metal" general purpose control plane device 604. The instantiation of the CCP instance 676A, as well as the virtualization layer 654 and software containers 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view.

The variable buffer timeout output action component 651 can be executed by hardware 640 to perform operations of one or more embodiments described herein above as part of software instances 652 (e.g., variable buffer timeout output action instance 681).

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method performed by a network device acting as a switch in a Software Defined Networking (SDN) network, the switch coupled to a controller in the SDN network, the method to implement variable buffer timeout output actions, the method comprising:
generating a flow entry that includes a packet matching criteria and an output action that specifies the controller as an output destination and a buffer timeout value;
receiving a packet for forwarding;
determining whether the packet matches the packet matching criteria of the flow entry;
storing the packet in a buffer of the switch and transmitting at least a portion of the packet to the controller in response to determining that the packet matches the packet matching criteria of the flow entry because the controller is specified as the output destination in the output action of the flow entry, the buffer to temporarily store the packet while the controller determines processing for the packet;
associating the buffered packet with the buffer timeout value specified in the flow entry to indicate that the buffered packet is to be deleted from the buffer if an instruction for processing the buffered packet is not received from the controller within a length of time indicated by the buffer timeout value;
determining whether an elapsed lifetime of the buffered packet reaches or exceeds the buffer timeout value; and
deleting the buffered packet from the buffer in response to determining that the elapsed lifetime of the buffered packet reaches or exceeds the buffer timeout value.

2. The method of claim 1, further comprising:
receiving an instruction from the controller for processing the buffered packet before an elapsed lifetime of the buffered packet reaches or exceeds the buffer timeout value;
processing the packet according to the instruction received from the controller; and
deleting the buffered packet from the buffer after the buffered packet has been processed.

3. The method of claim 1, wherein the packet matching criteria matches packets that are associated with a service.

4. The method of claim 3, wherein the service is any one of an Address Resolution Protocol (ARP) service, a Link Layer Discovery Protocol (LLDP) service, and a Dynamic Host Configuration Protocol (DHCP) service.

5. The method of claim 1, further comprising:
receiving a request from the controller to identify features supported by the switch; and
transmitting a response to the controller that identifies the features supported by the switch, wherein the identified features include a variable buffer timeout output action feature.

6. The method of claim 1, wherein the buffer is associated with the buffer timeout value.

7. The method of claim 1, wherein the switch communicates with the controller using an extension to OpenFlow.

8. A method performed by a network device acting as a controller in a Software Defined Networking (SDN) network, the method to implement variable buffer timeout output actions, the method comprising:
transmitting an instruction to a switch to generate a flow entry in the switch that includes a packet matching criteria and an output action that specifies the controller as an output destination and a buffer timeout value, wherein the generation of the flow entry in the switch causes the switch to store a received packet matching the packet matching criteria in a buffer of the switch, transmit at least a portion of the received packet to the controller because the controller is specified as the output destination in the output action of the flow entry, and delete the buffered packet from the buffer in response to determining that an elapsed lifetime of the buffered packet reaches or exceeds the buffer timeout value.

9. The method of claim 8, further comprising:
determining whether the switch supports a variable buffer timeout output action feature before transmitting the instruction to the switch.

10. A network device configured to implement variable buffer timeout output actions in a Software Defined Networking (SDN) network, the network device to act as a switch in the SDN network, the switch to be coupled to a controller in the SDN network, the network device comprising:
a non-transitory machine-readable storage medium to store a variable buffer timeout output action component; and
a processor communicatively coupled to the non-transitory machine-readable storage medium, the processor configured to execute the variable buffer timeout output action component, wherein the variable buffer timeout output action component is configured to generate a flow entry that includes a packet matching criteria and an output action that specifies the controller as an output destination and a buffer timeout value, receive a packet for forwarding, determine whether the packet matches the packet matching criteria of the flow entry, store the packet in a buffer of the switch and transmit at least a portion of the packet to the controller in response to determining that the packet matches the packet matching criteria of the flow entry because the controller is specified as the output destination in the output action of the flow entry, the buffer to temporarily store the packet while the controller determines processing for the packet, associate the buffered packet with the buffer timeout value specified in the flow entry to indicate that the buffered packet is to be deleted from the buffer if an instruction for processing the buffered packet is not received from the controller within a length of time indicated by the buffer timeout value, determine whether an elapsed lifetime of the buffered packet reaches or exceeds the buffer timeout value, and delete the buffered packet from the buffer in response to determining that the elapsed lifetime of the buffered packet reaches or exceeds the buffer timeout value.

11. A network device configured to implement variable buffer timeout output actions in a Software Defined Networking (SDN) network, the network device to act as a controller in the SDN network, the network device comprising:
a non-transitory machine-readable storage medium to store a variable buffer timeout output action component; and
a processor communicatively coupled to the non-transitory machine-readable storage medium, the processor configured to execute the variable buffer timeout output action component, wherein the variable buffer timeout output action component is configured to transmit an instruction to a switch to generate a flow entry in the switch that includes a packet matching criteria and an output action that specifies the controller as an output destination and a buffer timeout value, wherein the generation of the flow entry in the switch causes the switch to store a received packet matching the packet matching criteria in a buffer of the switch, transmit at least a portion of the received packet to the controller because the controller is specified as the output destination in the output action of the flow entry, and delete the buffered packet from the buffer in response to determining that an elapsed lifetime of the buffered packet reaches or exceeds the buffer timeout value.

12. The network device of claim 11, wherein the variable buffer timeout output action component is further configured to determine whether the switch supports a variable buffer timeout output action feature before transmitting the instruction to the switch.

13. A non-transitory machine-readable medium having computer code stored therein, which when executed by a set of one or more processors of a network device, causes the network device to perform operations for implementing variable buffer timeout output actions in a Software Defined Networking (SDN) network, the network device to act as a switch in the SDN network, the switch to be coupled to a controller in the SDN network, the operations comprising:
generating a flow entry that includes a packet matching criteria and an output action that specifies the controller as an output destination and a buffer timeout value;
receiving a packet for forwarding;
determining whether the packet matches the packet matching criteria of the flow entry;
storing the packet in a buffer of the switch in response to determining that the packet matches the packet matching criteria of the flow entry, the buffer to temporarily store the packet while the controller determines processing for the packet;
associating the buffered packet with the buffer timeout value specified in the flow entry to indicate that the buffered packet is to be deleted from the buffer if an instruction for processing the buffered packet is not received from the controller within a length of time indicated by the buffer timeout value;
transmitting a portion of the packet to the controller because the controller is specified as the output destination in the output action of the flow entry;
determining whether an elapsed lifetime of the buffered packet reaches or exceeds the buffer timeout value; and
deleting the buffered packet from the buffer in response to determining that the elapsed lifetime of the buffered packet reaches or exceeds the buffer timeout value and an instruction for processing the buffered packet has not been received from the controller.

14. The non-transitory machine-readable medium of claim 13, wherein the computer code, when executed by the set of one or more processors, causes the network device to perform further operations comprising:
receiving an instruction from the controller for processing the buffered packet before an elapsed lifetime of the buffered packet reaches or exceeds the buffer timeout value;
processing the packet according to the instruction received from the controller; and
deleting the buffered packet from the buffer after the buffered packet has been processed.

15. The non-transitory machine-readable medium of claim 13, wherein the packet matching criteria matches packets that are associated with a service.

16. A non-transitory machine-readable medium having computer code stored therein, which when executed by a set of one or more processors of a network device, causes the network device to perform operations for implementing variable buffer timeout output actions in a Software Defined Networking (SDN) network, the network device to act as a controller in the SDN network, the operations comprising:

transmitting an instruction to a switch to generate a flow entry in the switch that includes a packet matching criteria and an output action that specifies the controller as an output destination and a buffer timeout value, wherein the generation of the flow entry in the switch causes the switch to store a received packet matching the packet matching criteria in a buffer of the switch, transmit at least a portion of the received packet to the controller because the controller is specified as the output destination in the output action of the flow entry, and delete the buffered packet from the buffer in response to determining that an elapsed lifetime of the buffered packet reaches or exceeds the buffer timeout value.

17. The non-transitory machine-readable medium of claim 16, wherein the computer code, when executed by the set of one or more processors, causes the network device to perform further operations comprising:

determining whether the switch supports a variable buffer timeout output action feature before transmitting the instruction to the switch.

* * * * *